(12) United States Patent
Kimura (10) Patent No.: US 11,997,432 B2
(45) Date of Patent: May 28, 2024

(54) DISPLAY APPARATUS

(71) Applicant: Yuji Kimura, Tokyo (JP)

(72) Inventor: Yuji Kimura, Tokyo (JP)

(73) Assignee: MITSUMI ELECTRIC CO., LTD., Tokyo (JP)

(*) Notice: Subject to any disclaimer, the term of this patent is extended or adjusted under 35 U.S.C. 154(b) by 670 days.

(21) Appl. No.: 17/108,276

(22) Filed: Dec. 1, 2020

(65) Prior Publication Data

US 2021/0176441 A1    Jun. 10, 2021

(30) Foreign Application Priority Data

Dec. 6, 2019    (JP) ................................. 2019-220991

(51) Int. Cl.
*H04N 9/31* (2006.01)
*G03B 21/20* (2006.01)

(52) U.S. Cl.
CPC ....... *H04N 9/3182* (2013.01); *G03B 21/2033* (2013.01); *H04N 9/3158* (2013.01)

(58) Field of Classification Search
CPC . H04N 9/3182; H04N 9/3158; G03B 21/2033
USPC ........................................................ 359/298
See application file for complete search history.

(56) References Cited

U.S. PATENT DOCUMENTS

| | | | | |
|---|---|---|---|---|
| 2003/0015652 A1* | 1/2003 | Kandori | ............... | G02B 26/101 250/234 |
| 2012/0275001 A1* | 11/2012 | Ishibashi | .............. | H04N 9/3129 359/199.1 |
| 2017/0180690 A1* | 6/2017 | Jackson | ............... | G02B 26/101 |
| 2018/0020198 A1* | 1/2018 | Ogi | ......................... | G09G 3/025 |
| 2018/0367773 A1* | 12/2018 | Holub | .................. | H04N 9/3182 |
| 2019/0129294 A1* | 5/2019 | Kimura | ................ | H04N 9/3129 |
| 2019/0228705 A1 | 7/2019 | Furuya et al. | | |
| 2019/0313065 A1* | 10/2019 | Kitade | ............... | G11B 33/1466 |
| 2020/0314399 A1* | 10/2020 | Inukai | .................. | H04N 9/3182 |

FOREIGN PATENT DOCUMENTS

| | | |
|---|---|---|
| JP | 2002-365568 | 12/2002 |
| JP | 2018-060220 | 4/2018 |
| JP | 2019-128419 | 8/2019 |

OTHER PUBLICATIONS

Japanese Office Action dated Sep. 5, 2023 with respect to the corresponding Japanese patent application No. 2019-220991.
Office Action dated Jan. 16, 2024 issued with respect to the corresponding Japanese patent application No. 2019-220991.

\* cited by examiner

*Primary Examiner* — Sharrief I Broome

(74) *Attorney, Agent, or Firm* — IPUSA, PLLC

(57) ABSTRACT

A display apparatus for displaying video made by laser light includes at least one laser of which the light output varies in accordance with current, a storage unit configured to store at least one conversion table for correcting current-light output characteristics of the laser so as to approximate to desired characteristics, and a control unit configured to retrieve the conversion table from the storage unit to cause the at least one laser to emit light based on data converted using the conversion table.

5 Claims, 7 Drawing Sheets

EXPECTED SHADE LEVELS

FIG.6B

DISTORTED SHADE LEVELS

| INPUT SHADE LEVEL | 0 | 1 | 2 | 3 | 4 | 5 | 6 | 7 | 8 | 9 | ... | 255 |
|---|---|---|---|---|---|---|---|---|---|---|---|---|
| OUTPUT SHADE LEVEL | 0 | 0 | 2 | 4 | 5 | 3 | 6 | 8 | 9 | 10 | ... | 255 |

FIG.9

| INPUT SHADE LEVEL | 0 | 1 | 2 | 3 | 4 | 5 | 6 | 7 | 8 | 9 | ... | 255 |
|---|---|---|---|---|---|---|---|---|---|---|---|---|
| CONVERSION TABLE | 0 | 0 | 2 | 5 | 3 | 4 | 6 | 7 | 7 | 8 | ... | 255 |
| OUTPUT SHADE LEVEL | 0 | 0 | 2 | 3 | 4 | 5 | 6 | 8 | 8 | 9 | ... | 255 |

DISPLAY APPARATUS

CROSS-REFERENCE TO RELATED APPLICATION

This application claims priority under 35 U.S.C. § 119 to Japanese Patent Application No. 2019-220991, filed Dec. 6, 2019, the contents of which are incorporated herein by reference in their entirety.

BACKGROUND

1. Field of the Invention

The present disclosure relates to a display apparatus.

2. Description of the Related Art

Display apparatuses are known to project images on a screen while bidimensionally scanning with laser light. In such a display apparatus, for example, a microelectromechanical systems (MEMS) mirror that reflects the laser light is driven and thus directions in which the laser light is reflected are varied sequentially. In such a manner, the display apparatus bidimensionally scans with laser light.

Some display apparatuses make brightness correction or shade correction. In some cases, correction functions differ according to each display apparatus. Many display apparatuses provide the brightness correction and contrast correction. The brightness correction is achieved by, for example, varying an amount of light from a light source. For the contrast correction, for example, shade level correction is performed such that shade levels of pixels above and below a target pixel are further emphasized.

In both cases of the brightness correction and the contrast correction, for example, shade level tables preset in some patterns, or shade level conversion formulas defined in some patterns are stored in the display apparatus. Some display apparatuses have functions of compensating for their own characteristics that are provided based on gamma correction. Characteristic curves defined based on the gamma correction are preset in several patterns (See Japanese Unexamined Patent Application Publication No. 2002-365568, which is referred to as Patent document 1).

SUMMARY

The present disclosure provides a display apparatus capable of correcting variations in injection current-light output (I-L) characteristics of a laser.

The present disclosure provides a display apparatus for displaying video made by laser light, the display apparatus including at least one laser of which the light output varies in accordance with current, a storage unit configured to store at least one conversion table for correcting current-light output characteristics of the at least one laser so as to approximate to desired characteristics, and a control unit configured to retrieve the conversion table from the storage unit to cause the laser to emit light based on data converted using the conversion table.

DESCRIPTION OF THE EMBODIMENTS

Hereafter, one or more embodiments will be described with reference to the drawings. In each drawing, the same components are indicated by the same numerals and duplicate descriptions for the same components may be omitted.

Figure 1:
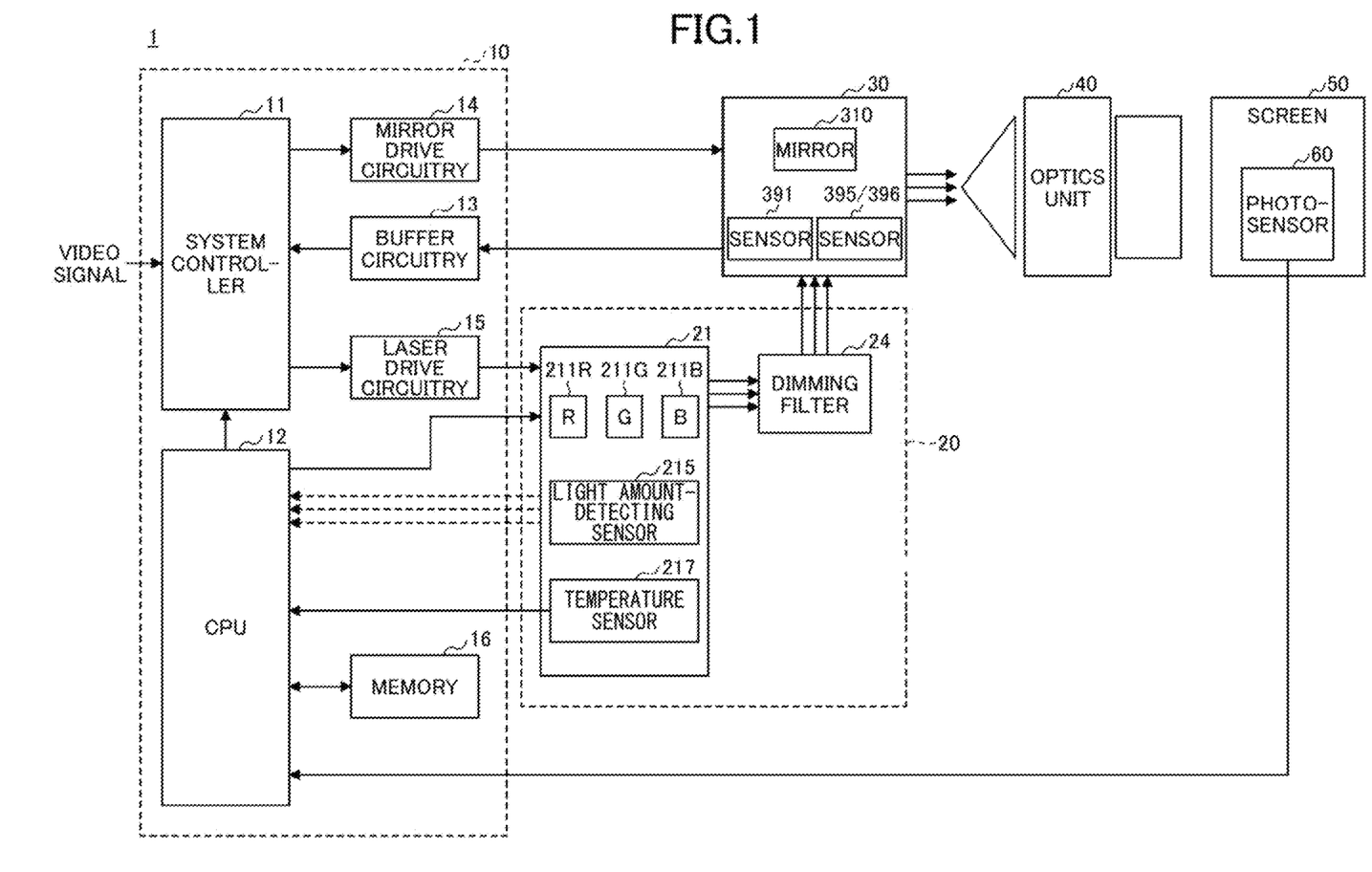
FIG. 1 is a block diagram illustrating an example of a display apparatus according to the present embodiment.
Figure 2:
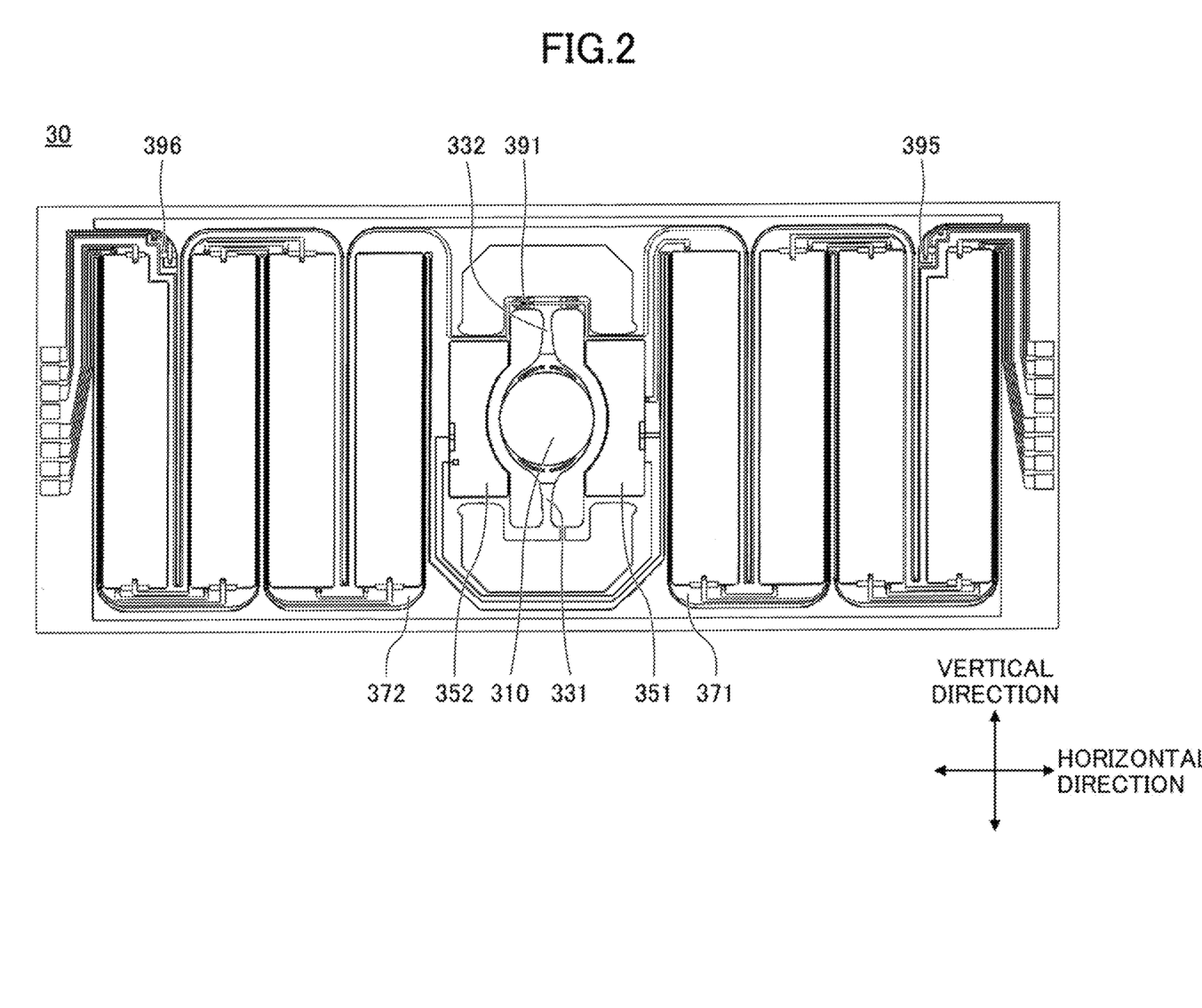
FIG. 2 is a plan view illustrating an example of a light scanning unit included in the display apparatus.

FIG. 1 is a block diagram illustrating an example of a display apparatus according to the present embodiment. FIG. 2 is a plan view illustrating an example of a light scanning unit included in the display apparatus. FIGS. 3A to 4B are diagrams illustrating an example of the appearance of the display apparatus according to the present embodiment.

(Schematic Configuration of Display Apparatus)

Hereafter, the schematic configuration of a display apparatus 1 will be described with reference to FIGS. 1 to 4B. The display apparatus 1 includes, as main components, circuitry 10, a light source 20, a light scanning unit 30, an optics unit 40, a screen 50, and a photosensor 60, and these components are accommodated in a casing 100. The display apparatus 1 is an apparatus that displays video made by laser light. For example, the display apparatus 1 is a laser scanning projector.

The circuitry 10 is circuitry that controls the light source 20 and the light scanning unit 30. For example, the circuitry 10 can include a system controller 11, a central processing unit (CPU) 12, buffer circuitry 13, mirror drive circuitry 14, laser drive circuitry 15, a memory 16 (e.g., flash memory), and the like. A video signal is input to the system controller 11 from outside the display apparatus 1.

The light source 20 includes a laser diode (LD) module 21 and a dimming filter 24.

The LD module 21 includes lasers 211R, 211G, and 211B of which light output varies in accordance to injection current. The LD module 21 also includes a light amount-detecting sensor 215 that monitors an amount of light immediately emitted from each of the lasers 211R, 211G, and 211B. The LD module 21 further includes a temperature sensor 217 and the like, and the temperature sensor 217 monitors a temperature of a given laser immediately after each laser emits light.

The laser 211R is, for example, a red semiconductor laser and can emit light of a wavelength $\lambda R$ (e.g., 640 nm). The laser 211G is, for example, a green semiconductor laser and can emit light of a wavelength $\lambda G$ (e.g., 530 nm). The laser 211B is, for example, a blue semiconductor laser and can emit light of a wavelength λB (e.g., 445 nm). For example, a photodiode or the like can be used as the light amount-detecting sensor 215. For example, a thermistor can be used as the temperature sensor 217.

The light scanning unit 30 employs, for example, microelectromechanical systems (MEMS) that cause a mirror 310 to be driven by one or more piezoelectric elements. The mirror 310 serves as a scanning unit that reflects light (synthesized light) emitted from the lasers 211R, 211G, and 211E and bidimensionally scans with the emitted light horizontally and vertically, in accordance with an input video signal, to thereby form an image on the screen 50.

Specifically, as illustrated in FIG. 2, the mirror 310 is supported at opposite sides of the mirror 310, by torsion beams 331 and 332 that serve as an axis. Drive beams 351 and 352 are paired so as to interpose the mirror 310 in a direction perpendicular to the torsion beams 331 and 332. Piezoelectric elements formed on respective surfaces of the drive beams 351 and 352 cause the mirror 310 to oscillate about the axis that is served by the torsion beams 331 and 332. In the following, the direction in which the mirror 310 oscillates about the axis that is served by the torsion beams 331 and 332 is referred to as a horizontal direction. For example, resonant vibrations are used in horizontal driving performed through the drive beams 351 and 352. In such a case, the mirror 310 can be driven at a high speed. A horizontal deflection sensor 391 is a sensor that detects the inclination of the mirror 310 relative to the horizontal direction, in a state in which the mirror 310 oscillates in the horizontal direction.

Drive beams 371 and 372 are paired outside of the drive beams 351 and 352. The drive beams 371 and 372 are each formed by coupling multiple cantilevers in a meandering shape, and each cantilever has a surface on which a piezoelectric element is formed. The piezoelectric elements of the surfaces of the drive beams 371 and 372 can cause the mirror 310 to oscillate in a vertical direction that is a direction perpendicular to the horizontal direction. Each of vertical deflection sensors 395 and 396 is a sensor that detects the inclination of the mirror 310 relative to the vertical direction, in a state in which the mirror 310 oscillates in the vertical direction. Note that in a unit 150 (see FIG. 3B), the light scanning unit 30 and other components such as the drive circuitry are provided in, for example, a ceramic package, and are covered by a ceramic cover.

Note that a longitudinal (axial) direction of each of the torsion beams 331 and 332 is inclined about 5 degrees relative to (100)-face identified based on crystal orientations. Also, a longitudinal direction of the cantilevers constituting each of the drive beams 371 and 372 is set parallel to the longitudinal direction (axial direction) of each of the torsion beams 331 and 332. Likewise, the longitudinal direction of the cantilevers constituting each of the drive beams 371 and 372 is inclined about 5° relative to the (100)-face identified based on crystal orientations.

Figure 3A:
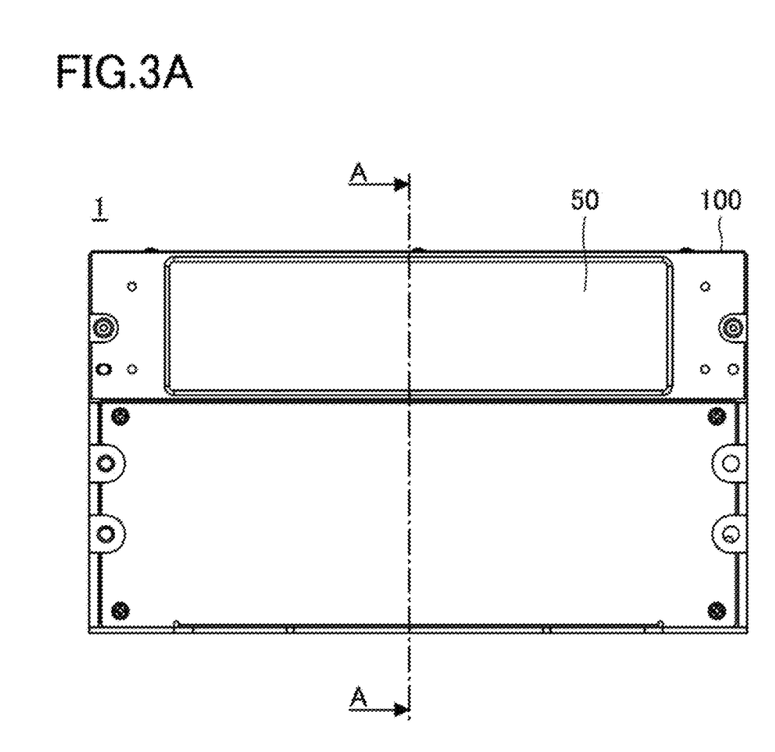
FIGS. 3A and 3B are diagrams (first part) illustrating an example of the appearance of the display apparatus according to the present embodiment.
Figure 3B:
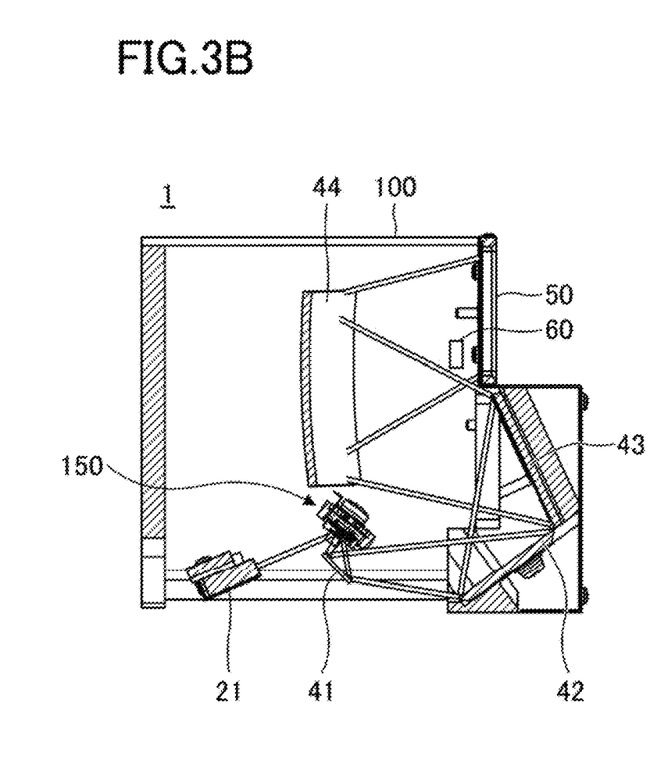
Figure 4A:
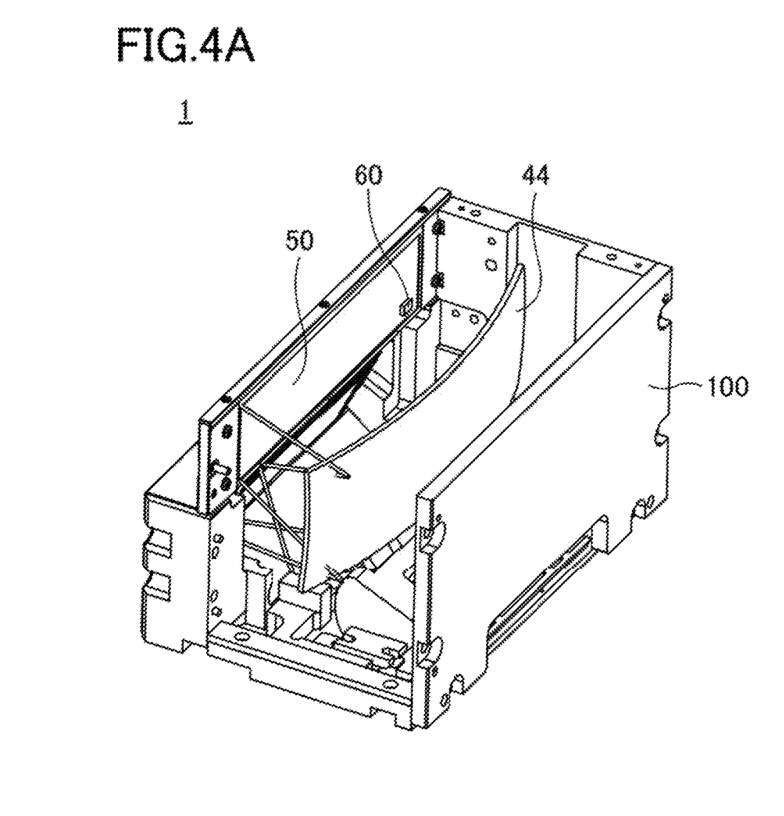
FIGS. 4A and 4B are diagrams (second part) illustrating an example of the appearance of the display apparatus according to the present embodiment.
Figure 4B:
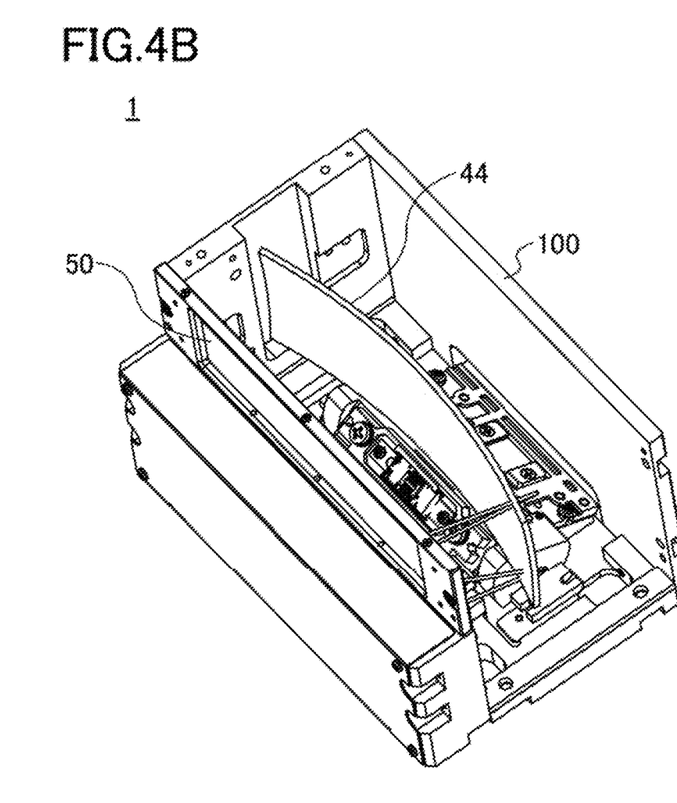

The optics unit 40 is an optical system for irradiating the screen 50 with light used when the light scanning unit 30 scans. The optics unit 40 can include a reflective mirror 41, a reflective mirror 42, a reflective mirror 43, a concave mirror 44, and the like, as illustrated in FIG. 3B or the like. The light entering the optics unit 40 from the light scanning unit 30 is substantially collimated by the concave mirror 44 and then is focused onto the screen 50. As a result, an image is formed on the screen 50 in accordance with the video signal. The screen 50 preferably includes a function (such as a microlens array) of eliminating noise, which is called speckles, appearing in a grained pattern in the image.

The photosensor 60 is provided with respect to the screen 50 and detects laser light delivered to the photosensor 60 in each of a forward pathway (first direction) and a backward pathway (second direction) with respect to horizontal scanning that is performed with laser light. For example, a photodiode or the like can be used as the photosensor 60.

(Schematic Operation of Display Apparatus)

Hereafter, the schematic operation of the display apparatus 1 will be described. For example, the system controller 11 can adjust a deflection angle of the mirror 310. The system controller 11 uses the buffer circuitry 13 to monitor the inclination of the mirror 310 relative to each of the horizontal direction and the vertical direction, and the monitored inclination of the mirror 310 is obtained by one or more given sensors among the horizontal deflection sensor 391 and the vertical deflection sensors 395 and 396. Further, the system controller 11 can supply an angle control signal to the mirror drive circuitry 14. The mirror drive circuitry 14 supplies a predetermined drive signal to each of the drive beams 351 and 352 and the drive beams 371 and 372, based on the angle control signal from the system controller 11. The mirror drive circuitry 14 can cause the mirror 310 to be driven to a predetermined angle. In other words, the mirror 310 can scan at the predetermined angle.

The system controller 11 can also supply, for example, a digital video signal to the laser drive circuitry 15. The laser drive circuitry 15 applies a predetermined current to each of the lasers 211R, 211G, and 211B based on the video signal from the system controller 11. In such a configuration, the lasers 211R, 211G, and 211B respectively emit red, green, and blue lights each of which is modulated in accordance with the video signal. By synthesizing these lights, a color image can be formed.

The CPU 12 monitors, for example, an amount of light emitted from each of the lasers 211R, 211G, and 2118, based on the output of the light amount-detecting sensor 215. The CPU 12 can supply a light-amount control signal to the LD module 21 accordingly. For each of the lasers 211R, 211G, and 211B, a current control is performed based on the light amount-control signal from the CPU 12, so that the output of a given laser is adjusted to a predetermined output (light amount).

Note that the light amount-detecting sensor 215 can include three sensors that independently detect amounts of light emitted from the lasers 211R, 211G, and 211B. Alternatively, the light amount-detecting sensor 215 may include merely one sensor. In this case, the lasers 211R, 211G, and 211B emit light in sequence and then the one sensor sequentially detects the light emitted from the lasers 211R, 211G, and 211B. With such a configuration, the amount of light emitted from each of the lasers 211R, 211G, and 211B can be adjusted.

The CPU 12 monitors the temperature of each of the lasers 211R, 211G, and 211B based on the output of the temperature sensor 217. Also, the CPU 12 can supply, to the LD module 21, an appropriate light amount-control signal corresponding to the monitored temperature, based on the output of the temperature sensor 217.

The light of respective wavelengths emitted from the lasers 211R, 211G, and 211B is synthesized by a dichroic mirror or the like. Next, the synthesized light is dimmed by a dimming filter 24 to a predetermined light amount, and then the dimmed light enters the mirror 310. The mirror 310 bidimensionally scans with the emitted light. The light used when scanned is delivered to the screen 50 through the optics unit 40 to therefore form a two-dimensional image on the screen 50. Note that a function provided by the photosensor 60 will be described below.

(Shade Level Control of Laser)

A semiconductor emitting device includes two regions being a light emitting diode (LED) emission region where an LED emits light and a laser diode (LD) emission region where an LD emits light. These regions are distinguished from the magnitude of injection current. In general, a region used in a laser diode is the latter region. Injection current-light output characteristics (I-L characteristics) in the LD light emission region are not linear.

Figure 5:
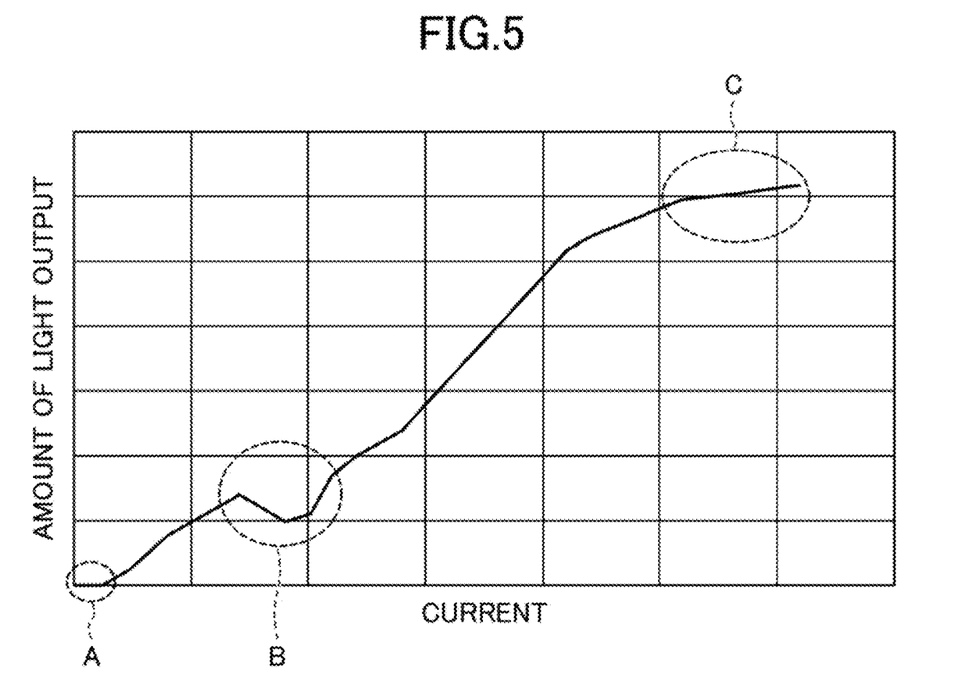
FIG. 5 is a diagram illustrating an example of I-L characteristics of a laser diode.

FIG. 5 is a diagram illustrating an example of the I-L characteristics of the laser diode. In the example in FIG. 5, a slope of the I-L characteristics is not linear at each of portions A, B, and C. The portion A is a portion near a threshold current at which the current magnitude is decreased. At the portion B, a current-light output line is bent and kinks appear where a line slope is inverted with respect to a negative slope or positive slope. The C portion relates to a high shade level region where the current magnitude is increased and the slope of the I-L characteristics is decreased and consequently becomes attenuated.

Figure 6A:
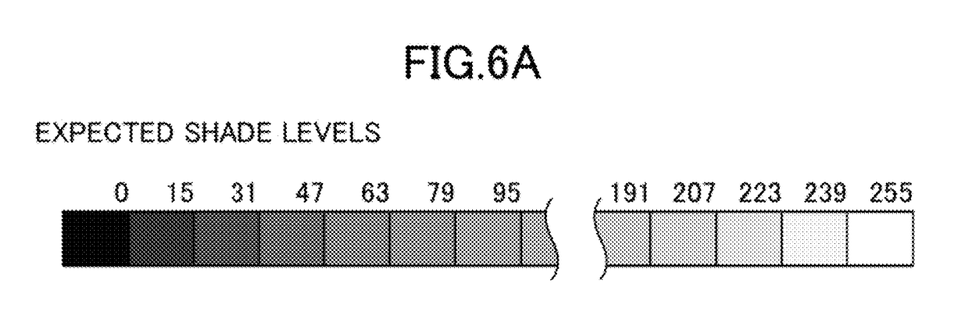
FIGS. 6A and 6B are diagrams for describing distorted shade levels.
Figure 6B:
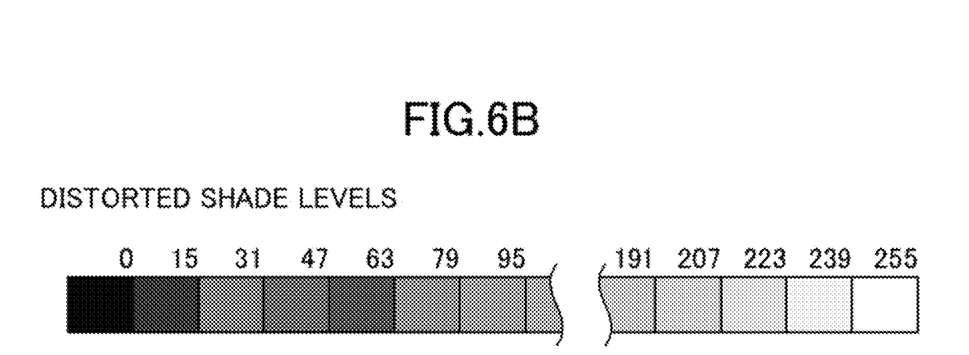

In many cases, the I (injection current)-L (light output) characteristics vary from one laser diode to another. In contrast, in the range of from low shade levels to high shade levels, when injection current is increased at regular intervals, the light output is not linear as in the case described in FIG. 5. For this reason, when the light output is presented using a color chart, color gradations are not represented properly as illustrated in FIG. 6B. FIG. 6A illustrates expected shade levels. When shade levels are represented with respect to the portions A, B, and C illustrated in FIG. 5, gradations are not represented properly, resulting in distorted shade levels as illustrated in FIG. 6B.

An environment in which the display apparatus 1 is used differs depending on an application. There are light environments and dark environments. When an ambient environment is dark, an amount of light of the display apparatus 1 is reduced. In such an environment, when gradations are not represented properly, colors could not be reproduced as suited.

Figure 7:
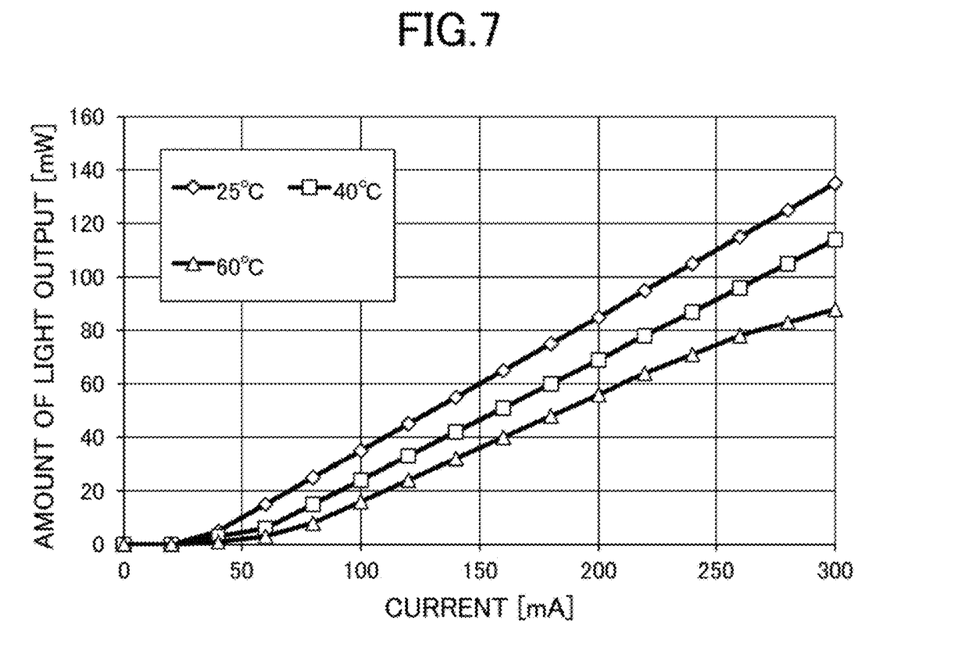
FIG. 7 is a diagram illustrating an example of temperature characteristics of the laser diode.

Further, the I-L characteristics described above vary with temperature. FIG. 7 illustrates an example of temperature characteristics of the laser diode. The laser diode has the temperature characteristics illustrated in FIG. 7. A linearity and a slope of the I-L characteristics vary depending on temperature. In the example in FIG. 7, the I-L characteristics at 25° C. are approximately linear. In contrast, for the I-L characteristics at 60° C., the light output is gradually attenuated in a high shade level region. In other words, the I-L characteristics are relatively linear at low temperatures. In contrast, the I-L characteristics becomes nonlinear at high temperatures and consequently the slope of the I-L characteristics is decreased in the high shade level region.

Accordingly, at high temperatures, even when a maximum light amount is maintained constantly under the control of a light amount, a projected image, in which middle shade levels are increased and thus shade levels as a whole cannot be reproduced correctly, appears. For this reason, there are cases where shade levels of output video in accordance with the video signal input to the display apparatus 1 are not represented as expected.

In order to solve the problem caused by non-linearity of the I-L characteristics of the laser diode as described above, for the display apparatus 1, a shade level control of the laser is performed.

Specifically, in the display apparatus 1, a plurality of conversion tables for correcting I-L characteristics are preliminarily created and stored in a memory 16 that is a storage unit. The CPU 12 selects an appropriate conversion table in accordance with a situation, and retrieves the selected conversion table from the memory 16 to transmit the conversion table to the system controller 11. The system controller 11 applies the selected conversion table to the video signal input to the display apparatus 1, and supplies converted data to the laser drive circuitry 15.

Each conversion table stores input shade levels and output shade levels. For the input shade levels, for example, 256 shade levels of a video signal, which are in the range of from minimum shade level 0 to maximum shade level 255, are associated with one-on-one output shade levels. In order to create the conversion table, first, I-L characteristics before correction with respect to each laser (lasers 211R, 211G, and 211B) to be used are acquired. At this time, it is assumed that an amount of light at each of the minimum shade level 0 and the maximum shade level 255 is adjusted to become an expected value.

Figure 8:
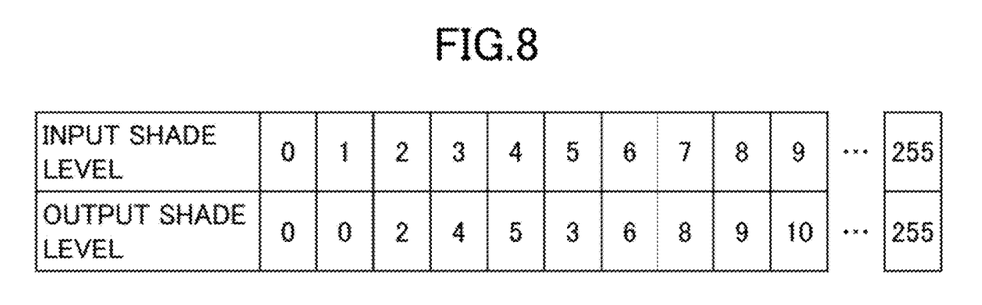
FIG. 8 is a diagram illustrating an example of the I-L characteristics (output shade levels with respect to input shade levels)

In this description, for ease of calculation, as an example, a given shade level selected from among the range of from the minimum shade level 0 to the maximum shade level 255 is normalized using the maximum shade level 255. For example, when the light output at the maximum shade level 255 is given as Lmax [mW], a normalized light amount In(n) at a given shade level n is determined by the formula In(n)=I(n)×255/Lmax, where, I(n) represents the light output [mW] at the shade level n. In this case, for example, I-L characteristics illustrated in FIG. 8 are obtained. In FIG. 8, a given input shade level corresponds to an I value given from the I-L characteristics, and a given output shade level corresponds to an L value given from the I-L characteristics.

Figure 9:
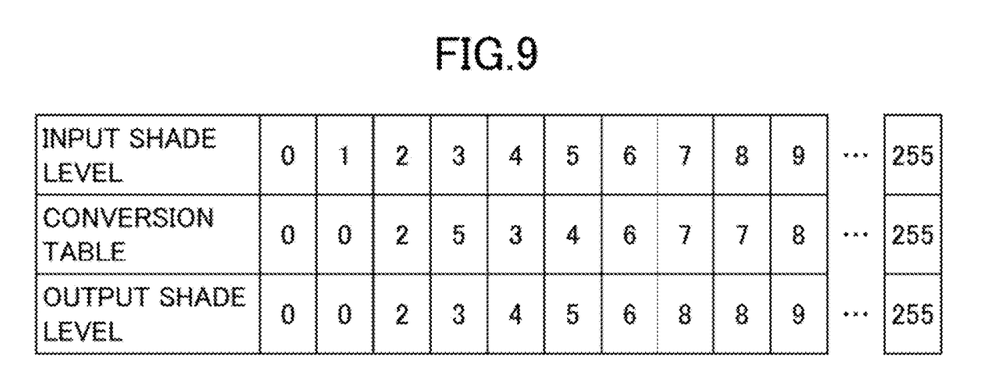
FIG. 9 is a diagram illustrating an example of a conversion table.

Hereafter, a conversion table is created based on input shade levels and output shade levels illustrated in FIG. 8. In FIG. 8, for example, an input shade level at output shade level 3 is 5, and an input shade level at output shade level 4 is 3. From such relations, as illustrated in FIG. 9, in the conversion table, a value at output shade level 3 is set to 5, and a value at output shade level 4 is set to 3. When a suitable input shade level is not available, a value is set by taking into account a value close to a given output shade level. Under such a condition, for example, the conversion table illustrated in FIG. 9 is obtained.

When the I-L characteristics before conversion (output shade levels in FIG. 8) are compared with the I-L characteristics after conversion (output shade levels in FIG. 9), it can be seen that the I-L characteristics after conversion (output shade levels in FIG. 9) approximates to a linearity in comparison to the I-L characteristics before conversion (output shade levels in FIG. 8). Note that a conversion table is created for each of the lasers 211R, 211G, and 211B.

When I-L characteristics differ depending on temperature, conversion tables are preliminarily obtained for respective different temperatures, in the same manner as described above. Preferably, a control unit (the system controller 11 and the CPU 12) switches the conversion tables in accordance with variation in an ambient temperature detected by the temperature sensor 217. The temperature set for each of the conversion tables depends on a specification of the display apparatus. For example, the temperature can be selected from among −5° C., 10° C., 25° C., 40° C., 65° C., and the like.

As described above, the display apparatus 1 includes a storage unit that stores conversion tables each of which is used to correct for current-light output characteristics of a given laser so as to approximate to desired characteristics. Further, the display apparatus 1 also includes the control unit (the system controller 11 and CPU 12) that retrieves a given conversion table from the storage unit and causes a given laser to emit light based on data converted using the conversion table.

Each conversion table can be set as a table in which input shade levels correspond to one-on-one out shade levels. There are no restrictions other than upper and lower limits of settable shade levels. When each conversion table is created, first, digital data with multiple shade levels is preliminarily obtained. Then, the conversion table, a value indicating a given shade level to be converted is set so that the digital data with the multiple shade levels approximates to a linearity.

With use of such conversion tables, I-L characteristics for which approximation is needed to be performed using a high-degree function, or I-L characteristics for which function approximation is not easily performed, can be easily corrected. For example, even in a case of complex I-L characteristics, such as characteristics for which kinks appear, correction can be made so that the I-L characteristics is linearly approximated.

Preferably, multiple conversion tables are each created with respect to an ambient temperature to be stored in the memory 16. In such a configuration, I-L characteristics can be corrected in accordance with a given ambient temperature. Further, the I-L characteristics can be corrected in accordance with a required maximum light amount. In other words, a projected image with predetermined shade levels can be provided at any time regardless of ambient temperature. Further, a projected image with predetermined shade levels can be provided at any time regardless of whether a decreased light amount or an increased light amount is provided.

Even when there are variations in I-L characteristics of individual lasers that are provided in the display apparatus, each conversion table can be created by taking into account the variation with respect to a given laser. Thus, variation in shade levels according to each individual display apparatus can be minimized.

In the correction made using the conversion tables described above, a given table is used for correction, and calculation is not performed. In this case, it is advantageous for circuitry or software for performing image processing, from the viewpoints of a space taken up by hardware or load.

In a case of software or correction circuitry, correction made using the conversion tables is achieved. For example, for a given display apparatus, when shade level correction applies only to linear function correction, distortion of I-L characteristics could not be corrected. In this case, in actuality, the software or the correction circuitry would not updated. However, in the case of making correction using a given conversion table, by merely converting a value indicating a given input shade level into a corresponding value in the conversion table, the I-L characteristics can be corrected.

Note that conversion tables are preferably created for each laser to be stored in the memory 16. Preferably, one or more conversion tables for at least one red laser are stored. Where, for I-L characteristics of the red laser, non-linearity is relatively enhanced.

A method of correcting the I-L characteristics using conversion tables to approximate a linearity has been described above. However, such a method is not limiting. One or more conversion tables are used to make tone curve correction such that I-L characteristics approximate desired characteristics. For example, an optimal gradation curve defined based on, e.g., gamma correction, can be set using one or more conversion tables. One or more conversion tables are used to be able to be set any contrast.

(Detection of Laser Light by Photosensor 60)

In the display apparatus 1, the photosensor 60 is provided with respect to the screen 50 to detect laser light delivered to the photosensor 60 in each of the forward pathway (first direction) and backward pathway (second direction) with respect to horizontal scanning that is performed using the laser light.

Figure 10:
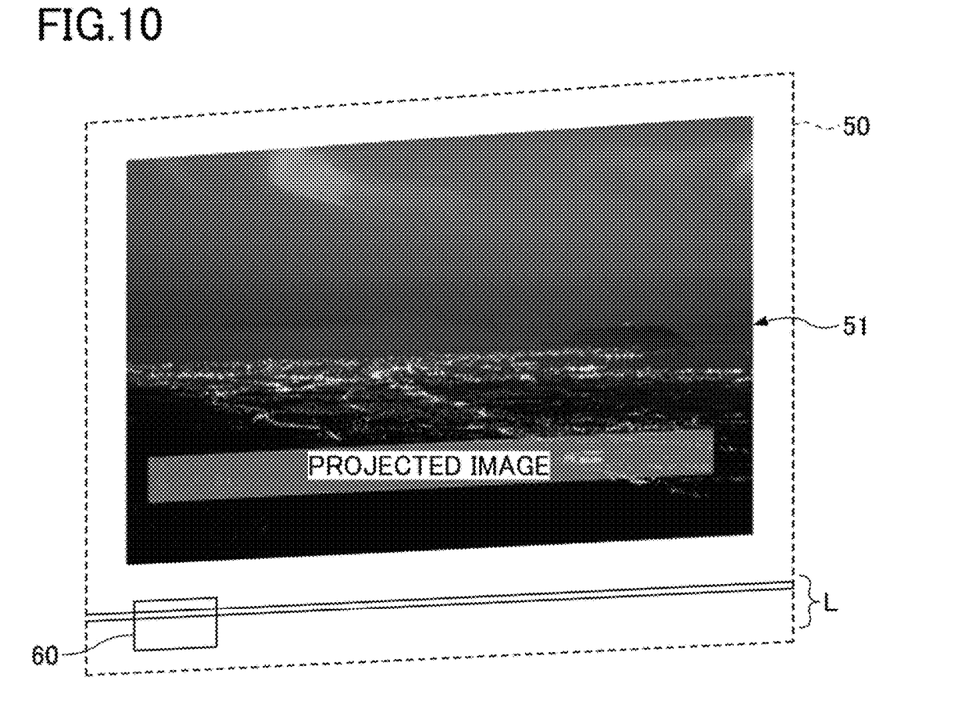
FIG. 10 is a diagram illustrating an example of arrangement of a photosensor with respect to a screen.

FIG. 10 is a diagram illustrating an example of arrangement of the photosensor in the screen. As illustrated in FIG. 10, the photosensor 60 is disposed at a location outside (a blanking region) of a display region 51 of the screen 50 where an image is displayed, and the location is, for example, under the bottom left of the display region 51. Note that the screen 50 has a region scanned with laser light, and the display region 51 is a region where an image input to the display apparatus 1 is projected.

Note that in the example in FIG. 10, the photosensor 60 is disposed under the display region 51, but is not limited to the example described above. When the photosensor 60 is disposed with respect to the blanking region under the display region 51, the photosensor 60 may be situated under a middle portion of the display region 51 in the horizontal scanning direction. The photosensor 60 may also be disposed with respect to a given blanking region above the display region 51. The photosensor 60 may be disposed with respect to a given blanking region on a left or right side of the display region 51.

The photosensor 60 is used for correction of a deflection angle and a phase shift with respect to the horizontal scanning direction, as well as correction of a deflection angle with respect to the vertical scanning direction, where laser light used to scan the blanking region is used as a reference beam L. The photosensor 60 detects multiple reference beams L that are delivered to respective different locations situated with respect to the vertical scanning direction.

Note that in the present embodiment, for example, one reference beam L is radiated for each one frame, and the screen 50 is scanned with respect to the horizontal direction. In the present embodiment, for example, the number of reference beams L delivered to the blanking region may be about 20.

Figure 11:
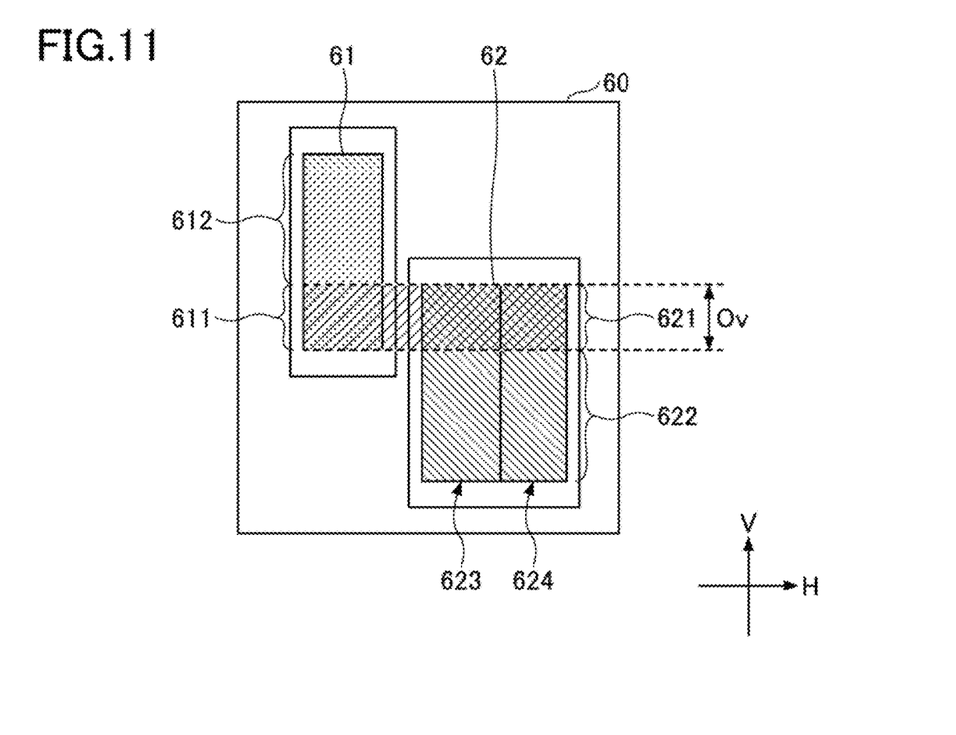
FIG. 11 is a diagram illustrating an example of the configuration of the photosensor.

FIG. 11 is a diagram illustrating an example of the configuration of the photosensor. As illustrated in FIG. 11, the photosensor 60 includes a photodiode (PD) 61 with a first light reception region, and includes a PD 62 with a second light reception region. In the present embodiment, correction of a deflection angle and phase shift of the mirror 310 with respect to the horizontal scanning direction, as well as correction of a deflection angle of the mirror 310 with respect to the vertical scanning direction, are made based on detected results of laser light at the multiple photodiodes (PDs) 61 and 62.

In the photosensor 60, the PD 61 and the PD 62 are arranged to overlap a region to be scanned with respect to the vertical scanning direction of the mirror 310. In other words, the photosensor 60 is a photo detector having the first light reception region and the second light reception region that are arranged at different locations with respect to the vertical scanning direction.

Note that in FIG. 11, a direction represented by the arrow V is the vertical scanning direction of the mirror 310, and a direction represented by the arrow H is the horizontal scanning direction of the mirror 310.

The PD 61 and PD 62 are used to correct a deflection angle of the mirror 310 with respect to the vertical scan direction. The PD 62 is used to correct a deflection angle and phase shift of the mirror 310 with respect to the horizontal scanning direction.

In the photosensor 60, the PD 61 and the PD 62 are each arranged to overlap a region corresponding to a pitch Ov with respect to the vertical scanning direction. In the following description, a region of the PD 61 corresponding to the pitch Ov is referred to as an overlap region 611, and a region of the PD 62 corresponding to the pitch Ov is referred to as an overlap region 621.

Each of the overlap region 611 and overlap region 621 is a light reception region where scanning with respect to the vertical scanning direction is performed using multiple reference beams delivered to different locations of the region. When the overlap regions 611 and 621 are each scanned with one or more given reference beams, the reference beams emitting a given overlap region are detected.

When the overlap region 611 of the PD 61 is not scanned and the region 612 is scanned with a given reference beam, the PD 62 does not detect the reference beam. Likewise, when the overlap region 621 of the PD 62 is not scanned and the region 622 is scanned with a given reference beam, the PD 61 does not detect the reference beam.

In such a configuration, when a given deflection angle of the mirror 310 with respect to the vertical scanning direction varies, at least any one, among the number of detection times of reference beams in the region 612 of the PD 61, the number of detection times of reference beams in the overlap regions 611 and 621, and the number of detection times of reference beams in the region 622, varies. In view of the point described above, according to the present embodiment, the deflection angle of the mirror 310 with respect to the vertical scanning direction is corrected in accordance with variation in at least one number of detection times described above.

Note that in the present embodiment, the overlap region 611 and the overlap region 621 are scanned with multiple reference beams. However, such a manner is not limiting. The number of reference beams used when the overlap region 611 and the overlap region 621 are scanned may be a single, which is not a plurality.

Preferably, the light reception regions of the PD 61 and the PD 62 are continuous with respect to the vertical scanning direction. However, these light reception regions may not be continuous. In other words, the PD 61 and the PD 62 may be disposed at different locations with respect to the vertical scanning direction. In this case, the overlap region 611 and the overlap region 621 may not be present in the PD 61 and the PD 62, respectively.

When the light reception regions of the PD 61 and the PD 62 are not continuous with respect to the vertical scanning direction, the deflection angle of the mirror 310 with respect to the vertical scanning direction may be corrected in accordance with variation in at least one among the number of detection times of reference beams in the first light reception region of the PD 61, and the number of detection times of reference beams in the second light reception region of the PD 62.

The PD 62 is used to enable the deflection angle and phase shift of the mirror to be detected with respect to the horizontal scanning direction. Specifically, the CPU 12 can specify a pixel (hereafter referred to as a "first pixel") detected, through the PD 62, in the forward pathway with respect to the horizontal scanning that is performed with laser light. The CPU 12 can also specify a pixel (hereinafter referred to as a "second pixel") detected through the PD 62, in the backward pathway with respect to the horizontal scanning that is performed with laser light. Further, the CPU 12 can detect and compensate for a phase shift of laser light with respect to the horizontal scanning direction, as well as variation in a deflection angle of the mirror 310, based on deviation from a desired value of a given first pixel and deviation from a desired value of a given second pixel.

The CPU 12 can specify a count value of the first pixel and a count value of the second pixel, based on a timing at which the PD 62 performs detection, with respect to which pixel number of a given image formed using laser light delivered to the screen 50 is indicated, out of a total number of pixels. Also, when the PD 62 can detect multiple pixels continuously arranged in the horizontal direction, the CPU 12 may specify, as a first pixel or a second pixel, the pixel that photosensor 60 first detects, for example.

The CPU 12 may repeatedly acquire a count value of a given first pixel and a count value of a given second pixel (predetermined number of times). For example, in a region outside of the display region corresponding to the PD 62, horizontal scanning is performed using a reference beam, for each one frame. In this case, the PD 62 detects, for each one frame, a given first pixel and a given second pixel, and can acquire, for each one frame, a count value of the first pixel and a count value of the second pixel.

In such a manner, based on deviation from a predetermined value of a given first pixel detected by the PD 62 when horizontal scanning is performed using laser light in the forward pathway with respect to the horizontal scanning, as well as deviation from a predetermined value of a given second pixel detected by the PD 62 when horizontal scanning is performed using laser light in the backward pathway with respect to the horizontal scanning, a phase shift of the laser light with respect to the horizontal scanning direction, and variation in a given deflection angle of the light scanning unit with respect to the horizontal scanning direction can detected and compensated.

The PD 62 may include, for example, multiple PDs 623 and 624 that are arranged with respect to the horizontal scanning direction. By arranging the multiple PD 623 and 624 with respect to the horizontal scan direction, detection accuracy of a given position where the reference beam is radiated with respect to the horizontal scanning direction can be improved. For example, in the present embodiment, while a region corresponding to the PD 623 is scanned using a reference beam, a signal corresponding to a light amount of the reference beam is output from the PD 623. Further, while a region corresponding to the PD 624 is scanned using a reference beam, a signal corresponding to a light amount of the reference beam is output from the PD 624.

In such a configuration, when the signal from the PD 623 is not output and the signal from the PD 624 is output, a reference beam is assumed to be detected and thus the PD 62 may output a signal indicating that it detects the reference beam.

When scanning is performed with laser light and the laser light is delivered to a boundary between the PD 621 and the PD 622, the PD 62 can output a signal indicating that a given first pixel and second pixel are detected. In other words, it can be detected that the reference beam is delivered to the boundary between the PD 623 and the PD 624 of the PD 62. Thus, detection accuracy of the position where the reference beam is radiated with respect to the horizontal scanning direction can be improved.

Here, in a case of the light output at low shade levels, a rate at which a light amount varies with respect to one step in which varying current of the laser driver is set is increased. Thus, a diameter of a given laser spot is varied increasingly. In light of the point described above, when the PD 62 is used to detect a deflection angle and phase shift with respect to the horizontal scanning direction, a target may be the light output in the range of middle shade levels to high shade levels. Note that when an amount of light emitting the PD 62 is increased, a dimming filter or the like may be disposed at a front stage of the PD 62 to reduce the light, in order to adjust light emitting the PD 62 to a desired permitted light amount for the PD 62.

As described above, there is variation in the I-L characteristics of a given laser. For this reason, if any correction is not made, the light output at the middle shade levels varies and a spot diameter of laser that is delivered to the PD 62 varies accordingly. For example, when the light output at the middle shade levels varies to be increased, a diameter of a given laser spot is increased and consequently a predetermined signal is output from the PD 62 at a timing that is earlier than that at a normal state. In contrast, when the light output with respect to the middle shade scale is varied to be decreased, a diameter of a given laser spot is decreased and consequently a predetermined signal is output from the PD 62 at a timing that is later than that at a normal state. As a result, detection accuracy of the reference beam may be reduced.

In contrast, in the display apparatus 1, since the I-L characteristics are corrected by using one or more conversion tables to thereby approximate a linearity, variation in the light output at the middle shade levels can be minimized. Accordingly, variation in a given spot diameter of laser delivered to the PD 62 can be minimized. As a result, detection accuracy of the reference beam can be improved. In other words, with use of the PD 62, detection accuracy of the deflection angle and the phase shift with respect to the horizontal scanning direction can be improved.

The preferred embodiments have been described in detail above. However, these embodiments are not limiting. Various modifications and substitutions to the embodiments described above can be made without departing from a scope described in the present disclosure.

For example, the embodiments has been described using an example in which a display apparatus in the present disclosure is applied to a laser scanning projector. However, such a manner is an example and the display apparatus in the present disclosure is applicable to a variety of laser-based apparatuses. Such apparatuses include, for example, a digital light processing (DLP) (which uses a digital micromirror device), a head-up display for an automobile, a laser printer, a laser scanning epilator, a laser head lamp, radio detection and ranging (LiDAR), and the like.

The embodiments have been described using an example of three lasers. However, at least one laser may be used. In this case, a monochrome display apparatus can be adopted.

What is claimed is:

1. A display apparatus for displaying video made by laser light, the display apparatus comprising:
    at least one laser of which the light output varies in accordance with current;
    a memory that stores at least one conversion table for correcting one or more first input shade levels relating to image data such that current-light output characteristics of the laser approximate to desired characteristics, the conversion table storing multiple first input shade levels, multiple second input shade levels, and multiple output shade levels that are in association with one another; and
    control circuitry configured to:
        convert a first input shade level relating to the image data into a second input shade level that is in association with the first input shade level in the conversion table, and
        cause the at least one laser to emit light based on an output shade level that is in association with the second input shade level in the conversion table, such that the output shade level linearly increases in accordance with an increasing first input shade level,
    wherein for each of one or more first input shade levels among multiple first input shade levels relating to the image data, the conversion table enables a first magnitude of the first input shade level to change to a second magnitude of a corresponding second input shade level, so that the output shade level varies linearly with the second magnitude of the second input shade level, and
    wherein the first magnitude is different from the second magnitude.

2. The display apparatus according to claim 1, wherein the light output in accordance with the current of the laser is given as digital data with the multiple first input shade levels, and
    wherein the conversion table is used to correct the first magnitude of a given first input shade level among the multiple first input shade levels of the digital data, such that characteristics of the digital data approximate to the desired characteristics.

3. The display apparatus according to claim 1, wherein the at least one conversion table includes a plurality of conversion tables, for respective ambient temperatures, and wherein the memory stores the plurality of conversion tables.

4. The display apparatus according to claim 1, wherein the at least one laser includes a plurality of lasers,
    wherein the at least one conversion table includes a plurality of conversion tables, for the respective lasers, and
    wherein the memory stores the plurality of conversion tables.

5. The display apparatus according to claim 1, wherein the desired characteristics are linear.

* * * * *